Sept. 1, 1953
E. DORNBUSH
2,650,553
BAKING DEVICE
Filed Oct. 25, 1950
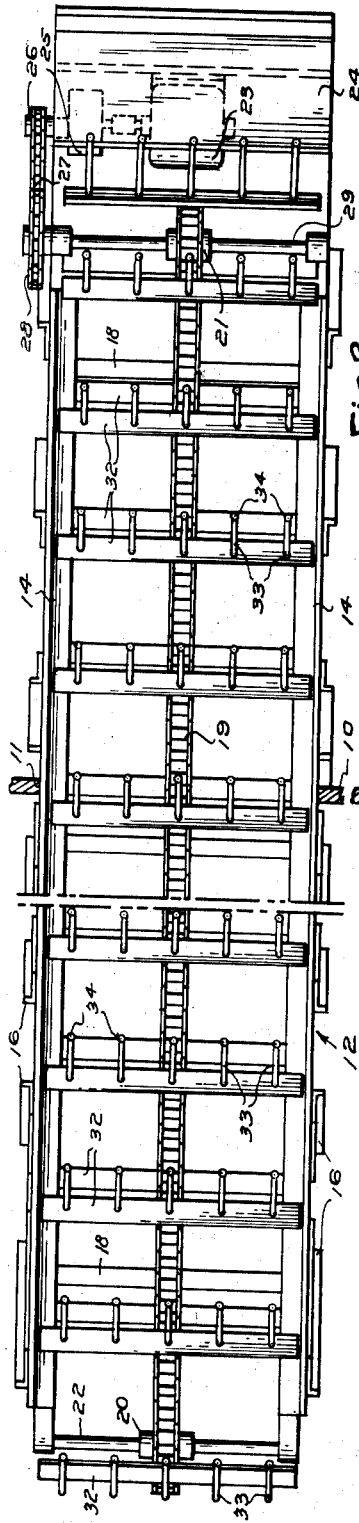
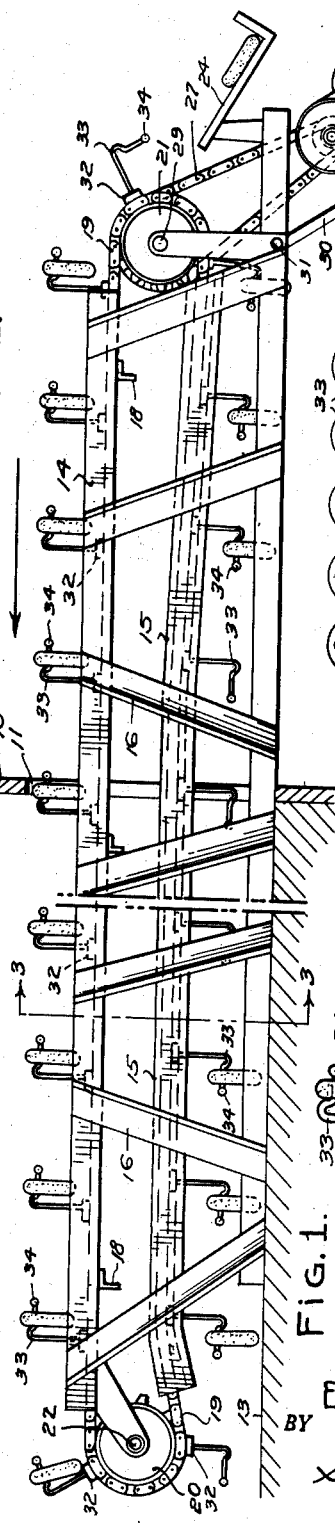
INVENTOR.
EDWARD DORNBUSH,
BY
Salvatore G. Militan
ATTORNEY.

Patented Sept. 1, 1953

2,650,553

UNITED STATES PATENT OFFICE 2,650,553

BAKING DEVICE

Edward Dornbush, Miami Beach, Fla.

Application October 25, 1950, Serial No. 191,964

4 Claims. (Cl. 107—57)

This invention relates generally to improvements in baking devices and is particularly directed to a continuous moving conveyor arrangement for holding and conveying bagels and the like to be baked through an oven and dispensing the bagels and the like after being properly baked.

The present manner of baking bagels and the like consists of placing a number of appropriately shaped pieces of dough on a long handled peel which the baker then inserts into the oven and deposits by a quick turn of the handle of the peel the dough onto the bed of the oven. The baker must be highly skilled in order to place the uncooked bagels in rows close to each other in order to utilize all the space in the oven and yet not permit any of the bagels to touch each other. After a short period of time at the exact moment when the bagels are half-cooked, the baker must turn over the bagels by the use of the peel. Then, when the bagels and the like are fully and properly baked, they are removed from the oven. In all of the above enumerated functions or steps in the baking of bagels and the like, that the baker must exercise from the uncooked shaped dough to a properly baked and marketable bagel and the like, the successful baker must have a high degree of dexterity and skill founded on many years of experience. Also, the total number of bagels and the like that the baker can effectively produce is limited since most of the bagels are to be individually handled or at best handled in small groups.

The present invention which comprises broadly an endless conveyor carrying a plurality of rows of inverted L-shaped members adapted to receive and maintain the individual bagels and the like, is mounted into an oven with one end thereof extending outside the front wall of the oven. Any person having little or no skill in the art of baking merely places a bagel on each of the carrier members at a position prior to entering the oven proper, while the conveyor moves continually at a predetermined rate of speed so that when the individual carriers arrive at the exposed end of the conveyor, the bagels being properly and completely baked are automatically deposited into a receiving receptacle. By a simple adjustment of the speed of the conveyor, the desired and proper baking time, that is, the time that the bagels are to remain in the oven under the existing circumstances, is easily arrived at.

A principal object of the present invention is to provide an automatically operating device for baking bagels, doughnuts, pretzels and the like, which require the attendance of only one person who need have little or no skill whatsoever, therefore reducing the labor cost to an absolute minimum.

A further object of the present invention is to provide a device capable of producing in a continuous manner baked goods many times the rate per hour which were previously produced by skilled hand labor in a day of tiresome work.

A further object of the present invention is to provide a device which produces a completely evenly baked article that had been permitted to rise in the course of baking to its fullest extent, rather than be blistered on the side that rests on the hot oven floor, as occurs in the present mode of baking said articles besides failing to rise unimpeded by its own weight.

A still further object of the present invention is to provide a device for baking bagels and the like which utilizes a small fraction of the oven required to produce a similar number under present day methods.

A still further object of the present invention is to provide a device for baking articles in an oven wherein the expansion and contraction of the various metal parts comprising the machine and exposed to the high baking temperatures are compensated for automatically.

With these and other objects in view, the invention will be best understood from a consideration of the following detailed description taken in connection with the accompanying drawing, forming a part of the present specification with the understanding, however, that the invention is not confined to any strict conformity with the showing of the drawing, but may be changed or modified so long as such changes or modifications mark no material departure from the salient features of the invention as expressed in the appended claims.

In the drawing:

Figure 1 is a side view in elevation of my invention as embodied in an oven.

Figure 2 is a plan view of said embodiment of my invention.

Figure 3 is a section taken through line 3—3 of Figure 1.

Figure 4 is a fragmentary view in elevation of the sprocket wheel and chain assembly showing the shifting on the holder of the article being baked.

Referring now to the drawing wherein like numerals indicate corresponding parts throughout the several views, the numeral 10 indicates the front wall of an oven having an opening 11 therein through which the conveyor device embodying the instant invention and generally designated by 12 extends, resting on the oven floor 13. The device 12 consists of a frame work of horizontally disposed angle irons 14, one on each side to form the upper track, and a similarly disposed pair of angle irons 15 at a lower level to form the lower track. The tracks 14, 14 and 15, 15 are secured in position by the plurality of upstanding brace members 16 set at an angle to each other to strengthen the frame work. A plurality of horizontally extending cross braces 17, 18 secured to angle irons connecting the lower ends of brace members 16 complete the support structure.

Centrally positioned in the device there is an endless chain 19 which meshes with a sprocket wheel 20 mounted at the far end of the conveyor and a sprocket wheel 21 mounted at the operating end of the device. A shaft 22 carrying the sprocket wheel 20 is rotatably mounted on the side members of the framework so that the top and bottom of the sprocket wheel 20 are on the same horizontal planes as the tracks 14 and 15. Carried by a platform on support 30 hereinafter described is a motor 23 connected to the drive shaft of a reduction box 25 on whose driven shaft a sprocket wheel 26 is mounted. A chain 27 meshes with the sprocket wheels 26 and 28, the latter wheel being mounted on a shaft 29 on which the sprocket wheel 21 is mounted. The shaft 29 is rotatably mounted at its ends on a support 30 which also carries the motor 23, reduction box 25 and sprocket wheel 26 at its lower portion, and which support is pivoted at 31 to the framework of the device. As can be readily seen, the weight of the motor 23 and gear box 25 will cause the support 30 to pivot about 31 in a clockwise direction as seen in Figure 1, so as to maintain the chain 19 always taut even though the chain 19 may expand due to its exposure to intense heat and later contract when the device is not in use.

Mounted transversely across and equally spaced on the chain and secured thereto are a plurality of carrier members 32 whose ends ride on the tracks 14 and 15 as best shown in Figure 3. Each of the carrier members 32 have a plurality of hooked wire members 33 of generally inverted L shape mounted thereon. The members 33 support the article such as bagels, etc. that are being baked and have an enlarged free end 34 to prevent the bagel, etc. from slipping off. (See Figure 4.)

On starting the motor 23 the chain 19 along with the members 33 move in the direction as shown by the arrow in Figure 1. An operator places the bagel or any other articles to be baked on the members 33 in the upper tier thereof prior to their entrance into the oven. The bagels are carried along the upper track 14 until they reach the far end of the device when they go around the sprocket wheel 20 and return on the lower track 15. It is to be noted that as the bagel holding member 33 moves around the sprocket wheel 20 going from the upper track 14 to the lower track 15, the bagel shifts without danger of falling off the member 33. However, when the member 33 rounds the sprocket wheel 21, the bagel slips off the free end 34 of the member 33 and falls onto a tray 24 where the bagels are collected and made ready for use and sale. In order that the device 12 may be adapted to bake various foods that require different baking times, the motor 23 may be of the variable speed type with a manual control for regulating the speed thereof, so that the particular food being baked may be maintained in the oven the precise time necessary to become properly baked.

Having now disclosed my invention and realizing that, in view of my disclosure many modifications in details of construction or design will readily occur to those skilled in the art, I do not choose to limit myself except as in the appended claims.

What I claim as new is:

1. A baking device for bagels and the like comprising a support mountable in an oven, track means mounted adjacent upper and lower portions of said support, endless conveyor means mounted for movement along said track means, means for rotating said conveyor means, a plurality of inverted L-shaped members rigidly mounted on said conveyor means whereby said members extend upwardly when travelling along said upper track means and downwardly when travelling along said lower track means, a leg portion of each of said members extending substantially horizontally in a direction opposite to the movement of said conveyor means, said leg portion adapted to receive and maintain a bagel and the like thereon, and restraining means contained by said leg portion adapted to prevent the inadvertent slippage of the bagel from said leg portion.

2. A baking device for bagels and the like comprising a support mountable in an oven, a pair of tracks mounted above each other on said support, an endless conveyor centrally positioned between said tracks on said support, power means for actuating said endless conveyor, a plurality of transverse bars secured to said conveyor and having their end portions riding on said tracks, a plurality of elongated members mounted in a substantially vertical position on said transverse bars, a second elongated member secured adjacent the top portion of each of said first named elongated members, said second elongated members extending substantially horizontally in a direction away from the direction of movement of said endless conveyor and adapted to receive a bagel and the like and means mounted at the free end of said second elongated members adapted to prevent the inadvertent slippage of the bagel from said member.

3. A baking device for bagels and the like comprising a support mountable in an oven with one end extending outside the oven, pairs of tracks mounted above each other on said support, an endless chain centrally positioned on said support, a sprocket wheel mounted at each end of said support and engaging said endless chain, motive means mounted at said one end of said support for actuating said endless chain, a plurality of transverse bars secured to said endless chain and having their end portions slidably positioned on said upper and lower pair of tracks, a plurality of inverted L-shaped members mounted on said transverse bars, said L-shaped members having a horizontally disposed leg portion extending in a direction opposite to the direction of movement of said endless chain and adapted to receive a bagel and the like.

4. The structure as recited in claim 1 wherein said restraining means comprises an enlarged member mounted on the free end of said leg portion.

EDWARD DORNBUSH.

References Cited in the file of this patent

UNITED STATES PATENTS

| Number | Name | Date |
|---|---|---|
| 123,391 | Giffhorn | Feb. 6, 1872 |
| 478,263 | Moss | July 5, 1892 |
| 841,821 | Smead | Jan. 22, 1907 |
| 1,268,857 | Lesher | June 11, 1918 |
| 2,202,882 | Wylie | June 4, 1940 |

FOREIGN PATENTS

| Number | Country | Date |
|---|---|---|
| 48,991 | Norway | Feb. 16, 1931 |